UNITED STATES PATENT OFFICE.

LEWIS BROWN, OF LANDING, NEW JERSEY, ASSIGNOR TO THE AMERICAN FORCITE POWDER MANUFACTURING COMPANY, OF NEW YORK, N. Y.

ABSORBENT OF NITRO-GLYCERINE.

SPECIFICATION forming part of Letters Patent No. 466,900, dated January 12, 1892.

Application filed September 5, 1891. Serial No. 404,885. (No specimens.)

*To all whom it may concern:*

Be it known that I, LEWIS BROWN, of Landing, in the county of Morris and State of New Jersey, have invented a new and useful Improvement in Mixtures Employed in the Manufacture of Nitro-Glycerine Blasting-Powder, of which the following is a specification.

My invention relates to an improvement in mixtures employed in the manufacture of nitro-glycerine blasting-powder for the purpose of absorbing the nitro-glycerine and holding it in a condition to be incorporated in the grading and coating mixture which finally prepares it for market and general use. The grading and coating mixture which determines the energy and quickness of the explosion and the protection of the grains from deterioration under the influence of the atmosphere forms the subject-matter of a separate application, Serial No. 404,886, filed of even date herewith.

The present application embraces only that mixture which is employed as an auxiliary in first securing the absorption of the nitro-glycerine in a granular mass, subject to further successful treatment. The formula for this auxiliary mixture may be stated as follows: eighty parts, by weight, of nitrate of soda; fourteen parts of wood pulp; five parts of glue; three parts of magnesia. These ingredients are thoroughly mixed, using sufficient water to make the mixture homogeneous and assist the separation of the mass into grains. When thoroughly mixed, the mass is screened and then dried to expel the water. The mixture will then be found to be in granular form and will readily absorb the nitro-glycerine, the latter taking the place of the expelled water.

While I have found the proportions named to be the most satisfactory it is possible that variations therefrom might prove more or less successful. I do not therefore wish to limit myself to the exact proportions named; but

What I claim is—

The mixture for the absorption of nitro-glycerine, comprising nitrate of soda, wood pulp, glue, and magnesia, combined in the proportions substantially as set forth.

LEWIS BROWN.

Witnesses:
FREDK. HAYNES,
GEORGE BARRY.